(12) United States Patent
Colson

(10) Patent No.: US 6,508,865 B2
(45) Date of Patent: Jan. 21, 2003

(54) METHOD AND APPARATUS FOR COMPRESSING ATMOSPHERIC AIR, AND CORRESPONDING AIR DISTILLATION AND GAS TURBINE INSTALLATIONS

(75) Inventor: Alain Colson, Saint Maur (FR)

(73) Assignee: L'Air Liquide, Societe Anonyme a Directoire et Conseil de Surveillance pour l'Etude et l'Exploitation des procedes Georges Claude, Paris (FR)

( * ) Notice: Subject to any disclaimer, the term of this patent is extended or adjusted under 35 U.S.C. 154(b) by 40 days.

(21) Appl. No.: 09/780,520

(22) Filed: Feb. 12, 2001

(65) Prior Publication Data

US 2001/0022137 A1 Sep. 20, 2001

(30) Foreign Application Priority Data

Feb. 11, 2000 (FR) .............................. 00 01731

(51) Int. Cl.$^7$ ................................ B01D 39/16
(52) U.S. Cl. ............................ 95/273; 95/273; 55/478; 55/480; 55/525; 55/DIG. 17; 96/127; 96/128
(58) Field of Search ......................... 55/323, 478, 480, 55/525, DIG. 17; 95/106, 115, 120, 123, 126, 273; 96/126, 127, 128

(56) References Cited

U.S. PATENT DOCUMENTS

| | | | |
|---|---|---|---|
| 4,336,043 A | | 6/1982 | Aonuma et al. |
| 5,261,946 A | | 11/1993 | Overby |
| 5,470,470 A | * | 11/1995 | Leyat .................... 210/350 |
| 5,797,980 A | * | 8/1998 | Fillet ....................... 95/106 |
| 6,159,259 A | * | 12/2000 | Maeda ................ 55/DIG. 17 |
| 6,165,244 A | * | 12/2000 | Choi ....................... 55/527 |

FOREIGN PATENT DOCUMENTS

| | | |
|---|---|---|
| CH | 557 191 | 12/1974 |
| EP | 57038916 | 3/1982 |

* cited by examiner

Primary Examiner—David A. Simmons
Assistant Examiner—Minh-Chau T. Pham
(74) Attorney, Agent, or Firm—Young & Thompson

(57) ABSTRACT

Atmospheric air passes through a droplet separator and then through one or more filtration stages. The first filtration stage is made of bag-filter elements with filter medium made up of synthetic fibres with a density which increases in the direction of air flow. The air is introduced thereinto at its natural temperature when between approximately −20° C. and +5° C.

19 Claims, 2 Drawing Sheets

METHOD AND APPARATUS FOR COMPRESSING ATMOSPHERIC AIR, AND CORRESPONDING AIR DISTILLATION AND GAS TURBINE INSTALLATIONS

BACKGROUND OF THE INVENTION

The present invention relates to a method for compressing atmospheric air using a centrifugal or axial compressor, this air being at a natural temperature between −20° C. and +5° C. approximately, outside of periods of freezing fog, supercooled rain or snow, of the type in which the droplets contained in the air are possibly separated, then the air is subjected to a filtration stage or to several successive filtration stages.

The air thus compressed may, for example, be intended to supply an air distillation apparatus or a gas turbine of the industrial type. The term "gas turbine of the industrial type" is to be understood as meaning gas turbines of the so-called "heavy duty" type, as opposed to so-called "aeroengine-derived" turbines.

DESCRIPTION OF THE RELATED ART

Atmospheric-air compressors in air distillation installations and "industrial" gas turbines take in wet air, the temperature and moisture conditions of which are such that the filters on the intake side of these machines may be subjected to icing when the ambient temperature is below a certain value. Such icing, which generally affects only the first filtration stage if several stages are used, may have very substantial negative effects and compromise the power consumption and reliability of the installation. Thus, depending on the design and structure of a given filter, on its mode of operation and on its degree of soiling at a given moment, the effects of the icing may lead to an excessive and inadmissible rise in the pressure drop across the intake filters.

The technical risks run by the compression machine located downstream and which are specific to this situation are high and, in consequence, the manufacturers of these machines frequently insist or recommend that the intake air be heated upstream of the filters so as to avoid any risk associated with possible icing of the filters. In the particular case of "industrial" gas turbines, heating is dictated when the temperature of the external air drops below +5° or even +8° C. and/or according to the relative humidity of the air. In the case of compressors for air that is to be distilled, the recommended heating threshold is generally close to these values. This heating is generally dictated irrespective of the type of filter installed on the intake side of these machines.

Now, heating the air results in a reduction in the density of the air, and therefore in a drop in compression or installation performance. This drop in performance associated with the heating may reach 3 to 7%, and this may be for a period of several months per year, which is extremely costly for the operator of the compression machine.

SUMMARY OF THE INVENTION

An object of the invention is to make it possible to dispense with the heating of the air associated with the problems of icing of the filters, while at the same time providing the compression machine with effective protection against soiling.

To this end, a subject of the invention is a method of the aforementioned type for compressing atmospheric air, characterized in that:

for the or the first filtration stage, use is made of bag-filter elements, the filter medium of which is made up of synthetic fibres with a density which increases in the direction of flow of the air through this medium; and the air is introduced into the said bag-filter elements at its natural temperature.

Other subjects of the invention are:

an apparatus for compressing atmospheric air, of the type comprising a centrifugal or axial compressor, possibly a droplet separator, and a filtration assembly comprising at least one filtration stage, characterized in that the or the first filtration stage comprises bag-filter elements, the filter medium of which is made up of synthetic fibres with a density which increases in the direction of flow of the air through this medium;

an installation for distilling air, characterized in that it comprises an apparatus for compressing atmospheric air as defined hereinabove, supplying an air distillation apparatus; and a gas turbine installation, characterized in that it comprises an apparatus for compressing atmospheric air as defined hereinabove, supplying a gas turbine of the industrial type.

BRIEF DESCRIPTION OF THE DRAWINGS

Exemplary embodiments of the invention will now be described with reference to the appended drawing, in which.

DESCRIPTION OF THE PREFERRED EMBODIMENTS

Figure 1:
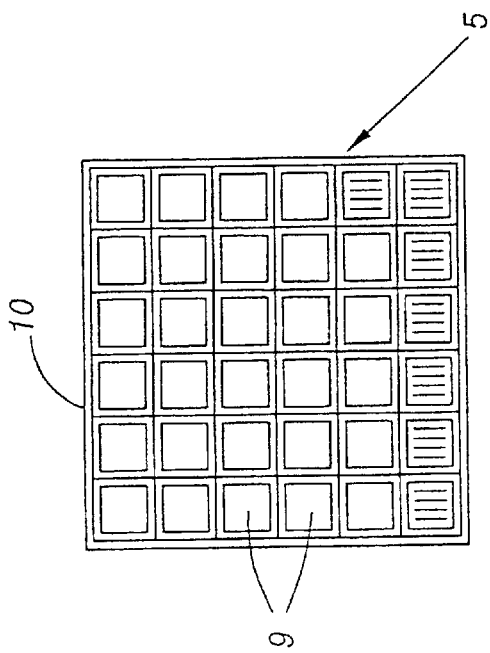
FIG. 1 schematically depicts an air compression installation according to the invention.

The compression installation depicted in FIG. 1 comprises an air compressor 1, the intake side of which is connected to a supply line 2. The latter has an inlet open to the atmosphere and comprises, working upstream to downstream, a heater R, a droplet separator 3 and a filtration assembly 4.

The filtration assembly 4 comprises a first filtration stage or upstream filtration stage 5, followed by one or more other filtration stages such as 6. Each stage is designed to filter out certain types of particle contained in atmospheric air, these particles having dimensions ranging typically from 0.01 μm to 10 μm approximately.

The delivery side of the compressor 1 is connected to a delivery pipe 7 which leads at 8 to the combustion chamber of an "industrial" gas turbine, or alternatively to an apparatus of an air distillation installation, particularly an apparatus that dries out and removes carbon from the air by adsorption.

Figure 2:
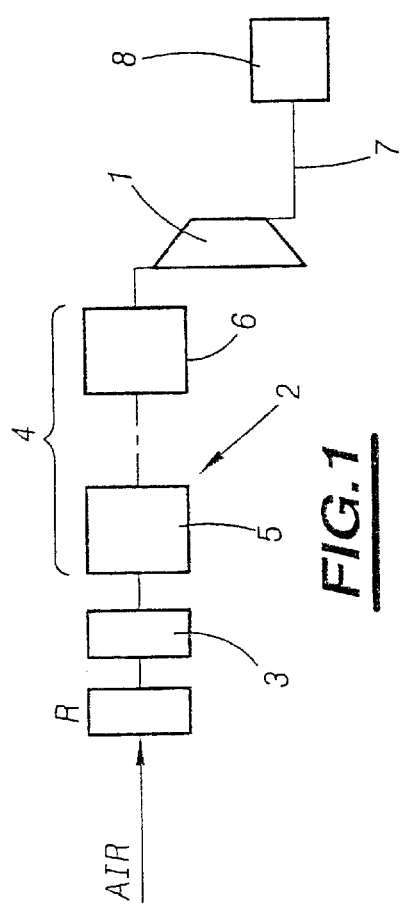
FIG. 2 schematically depicts the inlet side of the upstream filter in this installation.
Figure 3:
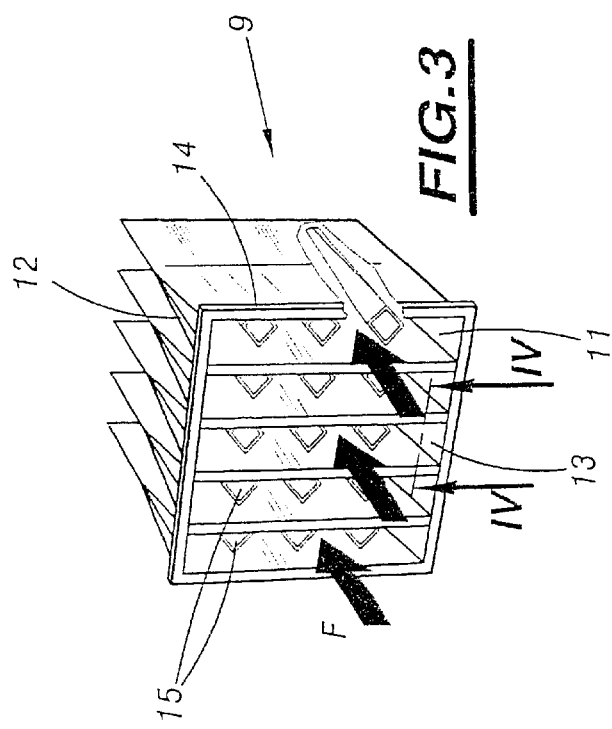
FIG. 3 is a schematic perspective view of the inlet side of a filter element of the filter of FIG. 2.
Figure 4:
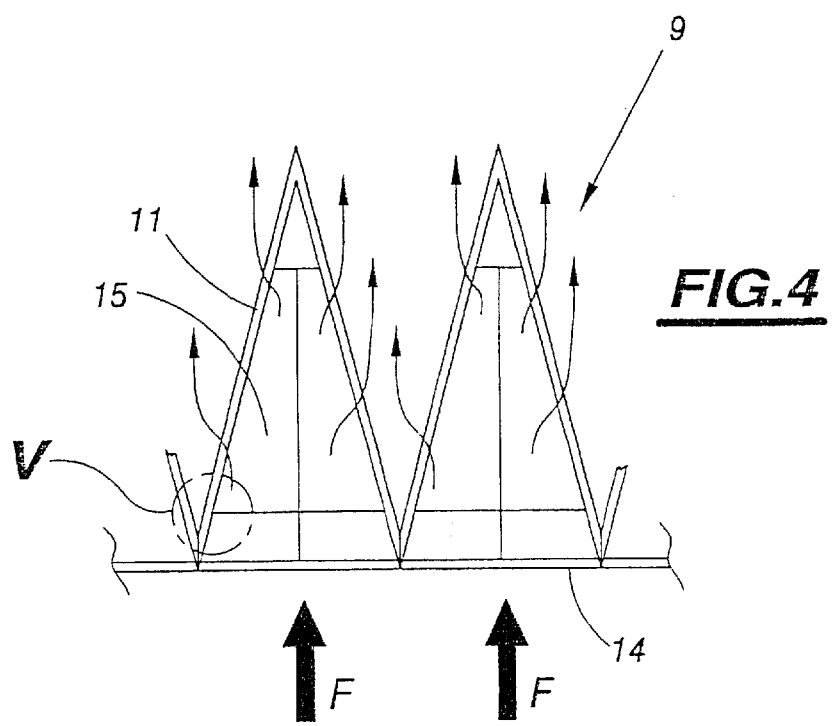
FIG. 4 is a partial schematic view in section on IV—IV of FIG. 3.
Figure 5:
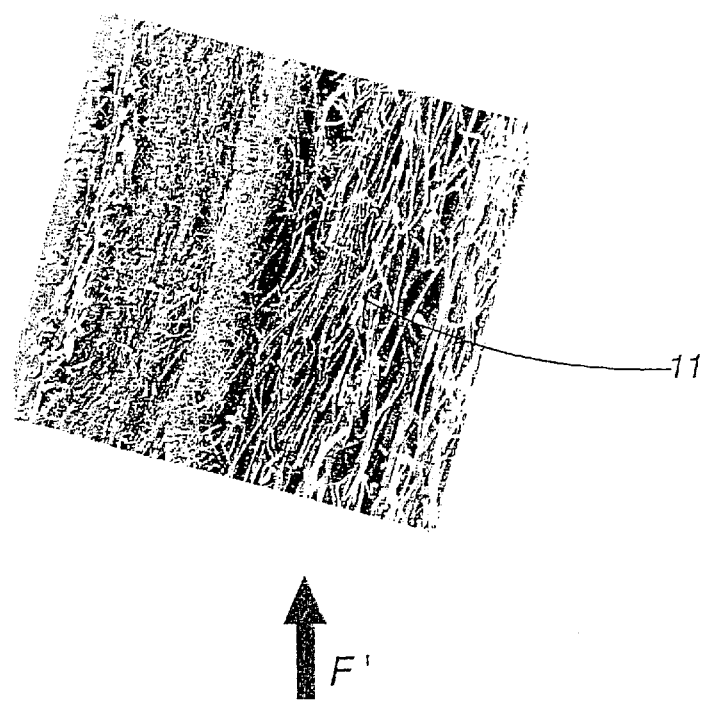
FIG. 5 depicts detail V of FIG. 4, in section, and on a larger scale.

The upstream filtration stage or upstream filter 5 is depicted schematically in FIG. 2. It consists of a juxtaposition of a great many filter elements 9 which are all identical and mounted in an assembly frame 10. One of these filter elements is depicted in FIGS. 3 to 5.

The filter element 9 comprises a folded collection of sheets 11 of filter medium, hot bonded along each edge 12 so as to form several juxtaposed bags 13, there being from six to twelve of these. The inlet edge of the set of bags is fixed by overmoulding or by mechanical fastening to an inlet surround 14 of square shape, which holds the inlet of the element 9 open.

In addition, each bag 13 generally contains several sleeves 15 that stabilize and distribute the air stream and which are contained in its overall mid-plane, to prevent the bag from collapsing and to guarantee effective use of the entire filtering area. Each sleeve 15 consists of a pyramid-shaped frustum of relatively rigid material, for example plastic, open at both ends and the axis of which is parallel to the overall direction F of flow of the air that is to be filtered. The sleeves 15 are held in place by hot welding or mechanical fastening to the sheets 11 (FIG. 4).

The filter element 9 is a bag filter of standard 24" format, that is to say one for which the surround 14 has the dimensions 592×592 mm. The depth of the filter element can be as much as 600 mm. The medium 11, known as a progressive structure medium, is made up of synthetic fibres, for example polypropylene or polycarbonate, arranged in several layers, the density of which increases from the upstream to the downstream end in the general direction of flow F' of the air through the medium, as depicted in FIG. 5. A medium such as this is insensitive to moisture and allows deep filtration. The element 9 has an open structure with a large filtration area over its entire depth and a very good distribution of the air flow.

The number of elements 9 is chosen according to the total flow rate of air to be compressed, so that the flow rate passing through each element 9 is less than or equal to 80% of the nominal flow rate, and typically less than or equal to 3000 m$^3$/h, with a mean speed of filtration (ratio of the air flow rate to the developed area of the medium 11) of between 0.1 and 0.4 m/s and preferably less than or equal to 0.2 m/s.

Surprisingly, it was found that with such filter elements operating under such conditions, for air at a temperature which could drop as low as −20° C. (outside of periods of freezing fog, supercooled rain or snow), the negative effects associated with iceing were almost completely eliminated, so that the pressure drop across the filtration stage 5 remained lower than its nominal upper limit, namely 250 Pa or 450 Pa depending on the class of effectiveness of the filter elements 9. The filtration stage 5 kept a very good retention capacity, limiting or eliminating the effects of clogging in the presence of water or moisture, while at the same time maintaining an extremely low pressure drop, as mentioned above, a gravimetric efficiency in excess of 99%, and an opacimetric efficiency which could be as much as 95%, according to ASHRAE 52.1 or 52.2 Standard and the Standard EN 779.

Examples of filter elements 9 which proved satisfactory are the bag filter PEL F6 marketed by the Dutch company FILTRAIR, or alternatively the bag filter T60 marketed by the German company FREUDENBERG. Each of these filters has a nominal flow rate higher than the value of 3000 m$^3$/h mentioned above.

The invention makes it possible to dispense with any heating of the air upstream of the air compressor during a substantial part of the year, thus avoiding any drop in air compressor performance due to the iceing phenomenon. The heater R is used only in periods of freezing fog, supercooled rain or snow. The energy savings thus made in cold weather are considerable for large-sized installations.

As will be appreciated, the invention also applies to installations with a single filtration stage 5.

As an alternative, the method of the invention can also be used to supply gas turbines of the aeroengine-derived type, or to provide industrial sites with compressed air used as a "utility" fluid, that is to say as an actuating fluid, control fluid, or the like.

Furthermore, each side of each filter element may have a dimension of 24", as indicated above, or a multiple or sub-multiple of this value. Thus, use may be made of filter elements measuring 24"×24", 12"×24", 24"×48", etc.

What is claimed is:

1. Method for compressing atmospheric air using a centrifugal or axial compressor (1), comprising the steps of:

subjecting air at a natural temperature to a filtration stage (5), the filtration stage (5) comprising bag-filter elements (9) with a filter medium (11) made up of synthetic fibres with a density which increases in a direction (F') of flow of the air through this medium, the air being introduced into the bag-filter elements (9) at the air's natural temperature; and establishing a flow rate of the air passing through each bag-filter element (9) at a value which corresponds to a mean speed of filtration through the medium (11) of between 0.1 and 0.4 m/s.

2. Method according to claim 1, wherein the mean speed of filtration through the medium (11) is between 0.1 and 0.2 m/s.

3. Method for compressing atmospheric air using a centrifugal or axial compressor (1), comprising the steps of:

subjecting air at a natural temperature to a filtration stage (5), the filtration stage (5) comprising plural bag-filter elements (9) with a filter medium (11) made up of synthetic fibres with a density which increases in a direction (F') of flow of the air through this medium, the air being introduced into the bag-filter elements (9) at the air's natural temperature, wherein each bag-filter element (9) is interchangeable with the other bag-filter elements, a front face of each bag-filter element having dimensions 592 mm×592 mm.

4. Method according to claim 3, wherein each side of the front face of each filter element has a dimension of 592 mm or a multiple or a sub-multiple of 592.

5. Method according to claim 3, wherein the filter medium (11) is a synthetic polymer.

6. Method according to claim 1, wherein the air flow rate is limited to 80% of the nominal flow rate for each filter element (9).

7. Method according to claim 1, wherein the step of subjecting the air to a filtration stage takes place before a step of subjecting the air to a compression stage.

8. Method according to claim 1, wherein the air subjected to the filtration stage subsequently provided to an air distillation apparatus or a gas turbine.

9. Apparatus for compressing atmospheric air, comprising:

a centrifugal or axial compressor (1); and a filtration assembly (7) comprising at least one filtration stage (5, 6), the filtration stage (5) comprising bag-filter elements (9) with a filter medium (11) made up of synthetic fibres with a density which increases in a direction (F') of flow of the air through this medium, wherein the flow rate of air passing through each bag-filter element (9) is established at a value which corresponds to a mean speed of filtration through the filter medium (11) of between 0.1 and 0.4 m/s.

10. Apparatus according to claim 9, wherein the mean speed of filtration through the filter medium (11) is between 0.1 and 0.2 m/s.

11. Apparatus for compressing atmospheric air, comprising:

a centrifugal or axial compressor (1); and a filtration assembly (7) comprising at least one filtration stage (5, 6), the filtration stage (5) comprising bag-filter elements (9) with a filter medium (11) made up of synthetic fibres with a density which increases in a direction (F') of flow of the air through this medium, wherein each bag-filter element (9) is interchangeable with the other bag-filter elements, a front face of each bag-filter element having dimensions 592 mm×592 mm.

12. Apparatus according to claim 11, wherein each side of the front face of each filter element has a dimension of 592 mm or a multiple or a sub-multiple of 592.

13. Apparatus according to claim 11, wherein the filter medium (11) is a synthetic polymer.

14. Apparatus according to claim 9, wherein the air flow rate is limited to 80% of the nominal flow rate for each filter element (9).

15. Apparatus according to claim 9, wherein the filtration assembly (4) is located upstream of the compressor (1).

16. Installation for distilling air, comprising:

an apparatus for compressing atmospheric air comprising a centrifugal or an axial compressor (1);

a filtration assembly (7) connected to the apparatus for compressing air, the filtration assembly comprising at least one filtration stage (5, 6), the filtration stage (5) comprising bag-filter elements (9) with a filter medium (11) made up of synthetic fibres with a density which increases in a direction (F') of flow of the air through this medium; and an air distillation apparatus connected to the filtration assembly, wherein the flow rate of air passing through each bag-filter element (9) is established at a value which corresponds to a mean speed of filtration through the filter medium (11) of between 0.1 and 0.4 m/s.

17. Gas turbine installation, comprising:

an apparatus for compressing atmospheric air comprising a centrifugal or axial compressor (1); and a filtration assembly (7) comprising at least one filtration stage (5, 6), the filtration stage (5) comprising bag-filter elements (9) with a filter medium (11) made up of synthetic fibres with a density which increases in a direction (F') of flow of the air through this medium, this apparatus for compressing being arranged to supply compressed air to an industrial gas turbine, wherein the flow rate of air passing through each bag-filter element (9) is established at a value which corresponds to a mean speed of filtration through the filter medium (11) of between 0.1 and 0.4 m/s.

18. Installation for distilling air, comprising:

a compressor for compressing atmospheric air;

a filtration assembly (7) connected to the compressor, the filtration assembly comprising at least one filtration stage (5, 6), the filtration stage (5) comprising bag-filter elements (9) with a filter medium (11) made up of synthetic fibres with a density increasing in a direction of flow of the air through this medium; and an air distillation apparatus connected to the filtration assembly, wherein each bag-filter element (9) is interchangeable with the other bag-filter elements, and a front face of each bag-filter element has dimensions 592 mm×592 mm.

19. Gas turbine installation, comprising:

an apparatus for compressing atmospheric air comprising a centrifugal or axial compressor (1); and a filtration assembly (7) comprising at least one filtration stage (5, 6), the filtration stage (5) comprising bag-filter elements (9) with a filter medium (11) made of synthetic fibres with a density which increases in a direction of flow of the air through this medium, the apparatus for compressing being arranged to supply compressed air to an industrial gas turbine, wherein each bag-filter element (9) is interchangeable with another of the bag-filter elements, and a front face of each bag-filter element has dimensions 592 mm×592 mm.

* * * * *